US010015391B2

(12) United States Patent
de Leon et al.

(10) Patent No.: US 10,015,391 B2
(45) Date of Patent: Jul. 3, 2018

(54) METHOD AND SYSTEM FOR ADJUSTING CAMERA SETTINGS USING CORNEAL REFLECTION

(71) Applicants: SONY CORPORATION, Konan, Minato-ku, Tokyo (JP); David de Léon, Lund (SE); Linus Mårtensson, Lund (SE); Ola Thörn, Lund (SE)

(72) Inventors: David de Leon, Lund (SE); Linus Martensson, Lund (SE); Ola Thorn, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 917 days.

(21) Appl. No.: 14/354,581

(22) PCT Filed: Feb. 13, 2014

(86) PCT No.: PCT/IB2014/058983
§ 371 (c)(1),
(2) Date: Apr. 27, 2014

(87) PCT Pub. No.: WO2015/121707
PCT Pub. Date: Aug. 20, 2015

(65) Prior Publication Data
US 2016/0014332 A1 Jan. 14, 2016

(51) Int. Cl.
H04N 5/232 (2006.01)
H04N 5/225 (2006.01)
(Continued)

(52) U.S. Cl.
CPC ..... H04N 5/23219 (2013.01); G06K 9/00248 (2013.01); G06K 9/00604 (2013.01);
(Continued)

(58) Field of Classification Search
CPC .................................................. H04N 5/23219
(Continued)

(56) References Cited

U.S. PATENT DOCUMENTS

2012/0050587 A1 3/2012 Yamamoto
2014/0098134 A1* 4/2014 Fein ........................ G06T 11/60
345/633

(Continued)

FOREIGN PATENT DOCUMENTS

EP 2309307 4/2011
WO 2008040576 4/2008

OTHER PUBLICATIONS

International Search Report and Written Opinion from corresponding International Application No. PCT/IB2014/058983, dated Apr. 15, 2014.

(Continued)

Primary Examiner — Yulin Sun
(74) Attorney, Agent, or Firm — Renner, Otto, Boisselle & Sklar, LLP

(57) ABSTRACT

Operating a camera system that includes a forward-facing camera directed at a forward scene and a rearward-facing camera directed at a rearward scene opposite the forward scene includes analyzing a video stream containing a reflection of the forward scene in a cornea of an eye of a user of the camera system, the video stream captured with the rearward-facing camera. The analyzing includes identifying an item in the reflection moving relative to a field of view of the forward-facing camera and predicted to enter the field of view of the forward-facing camera and identifying a characteristic of the item. A camera setting of the forward-facing camera is adjusted according to the characteristic of the identified item, the adjusted camera setting selected to (Continued)

improve capturing a photograph or video containing the item with the forward-facing camera.

18 Claims, 3 Drawing Sheets

(51) Int. Cl.
    *G06K 9/00*         (2006.01)
    *G06K 9/32*         (2006.01)
    *H04N 5/235*       (2006.01)
    *G06T 7/80*         (2017.01)

(52) U.S. Cl.
    CPC .......... *G06K 9/00664* (2013.01); *G06K 9/32* (2013.01); *G06T 7/80* (2017.01); *H04N 5/2258* (2013.01); *H04N 5/235* (2013.01); *H04N 5/23254* (2013.01); *G06T 2207/10016* (2013.01)

(58) Field of Classification Search
    USPC .......................................................... 348/78
    See application file for complete search history.

(56) References Cited

U.S. PATENT DOCUMENTS

| | | | | |
|---|---|---|---|---|
| 2014/0219506 A1* | 8/2014 | Foltin | ............... | G06K 9/00825 382/104 |
| 2014/0267010 A1* | 9/2014 | Pasquero | .............. | G06T 19/006 345/156 |
| 2015/0142753 A1* | 5/2015 | Soon-Shiong | ...... | G06F 17/3002 707/673 |
| 2015/0161881 A1* | 6/2015 | Takemura | .......... | G06K 9/00798 348/148 |

OTHER PUBLICATIONS

Nishino, Ko et al., "Eyes for Relighting", ACM Transactions on Graphics, Aug. 31, 2004, vol. 23, No. 3, pp. 704-711.

Takemura, Kentaro et al., "Estimating Focused Object using Corneal Surface Image for Eye-based Interaction", Sep. 25, 2013, retrieved from the internet <http://2013.petmei.org/wp-content/uploads/2013/09/petmei2013_session3_3.pdf>.

Nishino, Ko et al., "Corneal Imaging System: Environment from Eyes", International Journal of Computer Vision, Apr. 1, 2006, vol. 70, No. 1, pp. 23-40.

* cited by examiner

METHOD AND SYSTEM FOR ADJUSTING CAMERA SETTINGS USING CORNEAL REFLECTION

TECHNICAL FIELD OF THE INVENTION

The technology of the present disclosure relates generally to electronic devices and, more particularly, to an electronic device and a related method to adjust camera settings based on information acquired from analyzing a corneal reflection of a user.

BACKGROUND

Many modern electronic devices support photography features. For instance, some electronic devices include a forward-facing camera for taking photographs and video of a portion of a forward scene that is in a field of view of the forward-facing camera. The forward scene is the area that is in front of a user of the electronic device. In addition, some electronic devices also include a rearward-facing camera for taking photographs and video of a portion of a rearward scene that is in a field of view of the rearward-facing camera. In typical hand-held operation of the electronic device, the field of view of the rearward-facing camera includes the user. Therefore, the rearward-facing camera is often used to take self portraits or to carry out video telephony.

Taking sharp photographs and video depends on a variety of factors, including a number of camera settings. Exemplary camera settings that may have an effect on image quality include, but are not limited to, image stabilization (e.g., optical and/or digital system), light sensitivity settings (e.g., aperture, shutter speed, etc.), autofocus, color balance, mode of operation, etc. An exemplary operational mode is time shift where a number of images are captured in a period of time (e.g., two seconds) and the images are analyzed to select a best one of the images or combined to improved image quality.

But even with a variety of settings that may be adjusted to improve image quality, there is still room for improvement. For instance, to make automated changes to settings or trigger the capturing of images in a time shift made, the camera may analyze the content of the scene within the field of view of the camera. This technique cannot account for items that may be moving into the camera's field of view, either by movement of the item or by movement of the camera relative to the scene. This is because objects outside the camera's field of view are, in effect, unknown regardless of the analysis technique used to assess a preview video stream output by the camera.

Eye tracking has been proposed to improve camera performance. In this approach, a rearward-facing camera is used to track the gaze of the user and adjust autofocus or other settings of the forward-facing camera. But even if it is detected that the user is looking at an area outside the field of view of the forward-facing camera, the nature of the item at which the user is looking is speculative at best and changes in forward-facing camera settings cannot be effectively made.

SUMMARY

Disclosed are approaches of improving image quality. A rearward-facing camera is used to capture video of a forward scene reflected in a cornea of a user's eye. The video of the forward scene is analyzed to detect an item or items that may enter a field of view of a forward-facing camera. An item of this nature may include, for example, a moving object such as a person, an animal, a car, etc. Another item of this nature may include a relatively bright light or a dark region. One or more camera settings of the forward-facing camera may be adjusted according to the detected item to improve image quality. The movement is relative to the field of view of the forward-facing camera. Therefore, the movement may result from movement of the camera relative to the forward scene or movement of the item within the forward scene, or both.

According to one aspect of the disclosure, a method of operating a camera system that includes a forward-facing camera directed at a forward scene and a rearward-facing camera directed at a rearward scene opposite the forward scene is disclosed. The method includes analyzing a video stream containing a reflection of the forward scene in a cornea of an eye of a user of the camera system, the video stream captured with the rearward-facing camera and the analyzing including identifying an item in the reflection moving relative to a field of view of the forward-facing camera and predicted to enter the field of view of the forward-facing camera and identifying a characteristic of the item; and adjusting a camera setting of the forward-facing camera according to the characteristic of the identified item, the adjusted camera setting selected to improve capturing a photograph or video containing the item with the forward-facing camera.

According to one embodiment of the method, the adjustment to the camera setting of the forward-facing camera is timed with movement of the item relative to the field of view of the forward-facing camera to take effect when the item enters the field of view of the forward-facing camera.

According to one embodiment of the method, the identified item is an object and the camera setting is time-shift operation of the forward-facing camera.

According to one embodiment of the method, the time-shift operation is timed with movement of the item relative to the field of view of the forward-facing camera to take multiple images with the forward-facing camera when the object is in the field of view of the forward-facing camera.

According to one embodiment of the method, the identified item is one of an object or a light source and the identifying the characteristic including distinguishing whether the item is an object or a light source.

According to one embodiment of the method, the identified item is an object and the identifying the characteristic including detecting an object type for the item, the adjusted camera setting dependent on the detecting the object type.

According to one embodiment of the method, the identified item is an object and the identifying the characteristic including distinguishing if the object is a person or another object, the adjusted camera setting dependent on the distinguishing.

According to one embodiment of the method, the identified item is a light source and the adjustment to the camera setting compensates for the light source.

According to one embodiment of the method, the characteristic of the item is one or more of speed of movement relative to the field of view of the forward-facing camera, portion of the field of view of the forward-facing camera that the item is predicted to enter, brightness, range from the forward-facing camera, or object type.

According to another aspect of the disclosure, an electronic device includes a forward-facing camera directed at a forward scene; a rearward-facing camera directed at a rearward scene opposite the forward scene; and a control circuit that executes logical instructions to: analyze a video stream containing a reflection of the forward scene in a cornea of an eye of a user of the electronic device, the video stream captured with the rearward-facing camera, the analysis identifying an item in the reflection moving relative to a field of view of the forward-facing camera that is predicted to enter the field of view of the forward-facing camera and identifying a characteristic of the item; and adjust a camera setting of the forward-facing camera according to the characteristic of the identified item, the adjusted camera setting selected to improve capturing a photograph or video containing the item with the forward-facing camera.

According to one embodiment of the electronic device, the adjustment to the camera setting of the forward-facing camera is timed with movement of the item relative to the field of view of the forward-facing camera to take effect when the item enters the field of view of the forward-facing camera.

According to one embodiment of the electronic device, the identified item is an object and the camera setting is time-shift operation of the forward-facing camera.

According to one embodiment of the electronic device, the time-shift operation is timed with movement of the item relative to the field of view of the forward-facing camera to take multiple images with the forward-facing camera when the object is in the field of view of the forward-facing camera.

According to one embodiment of the electronic device, the identified item is one of an object or a light source and the identifying the characteristic including distinguishing whether the item is an object or a light source.

According to one embodiment of the electronic device, the identified item is an object and the identifying the characteristic including detecting an object type for the item, the adjusted camera setting dependent on the detecting the object type.

According to one embodiment of the electronic device, the identified item is an object and the identifying the characteristic including distinguishing if the object is a person or another object, the adjusted camera setting dependent on the distinguishing.

According to one embodiment of the electronic device, the identified item is a light source and the adjustment to the camera setting compensates for the light source.

According to one embodiment of the electronic device, the characteristic of the item is one or more of speed of movement relative to the field of view of the forward-facing camera, portion of the field of view of the forward-facing camera that the item is predicted to enter, brightness, range from the forward-facing camera, or object type.

DETAILED DESCRIPTION OF EMBODIMENTS

Figure 1:
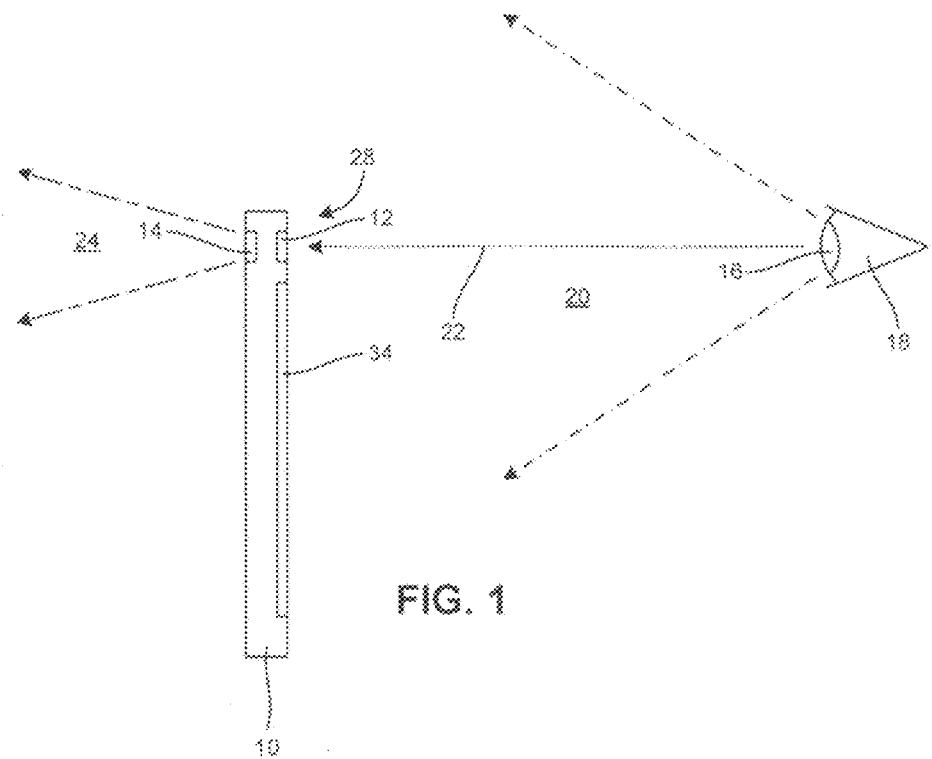
FIG. 1 is a schematic view of an electronic device in an operational environment for improving operation of a forward-facing camera of the electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling camera operation of the electronic device. The electronic device is typically—but not necessarily—a portable electronic device, and may take any form factor including, but not limited to, a mobile telephone, a tablet computing device, a laptop computer, a gaming device, a camera, or a media player. The electronic device shown in the appended figures is a mobile telephone, but applicability of aspects of the invention is not limited to mobile telephones.

With initial reference to FIG. 1, an electronic device 10 includes a housing that retains a rearward-facing camera 12 and a forward-facing camera 14. The forward-facing camera 14 (sometimes referred to as a "main camera") is typically used to take pictures and video of a scene in front of a user (referred to as a forward scene). The rearward-facing camera 12 (sometimes referred to as a "chat camera") is often used to pictures or video of a rearward scene that includes the user, such as to take self portraits or to carry out video telephony. As used herein, the terms forward-facing, in front of, forward scene, rearward-facing, rearward scene and the like are relative to a user. Therefore, camera components to accomplish forward-facing and rearward-facing tasks may depend on orientation of the electronic device with respect to the user. As such, the terms forward-facing camera and rearward-facing camera used in this disclosure refer to the cameras' roles in capturing photographs and video, and do not refer to their primary functions as a "main camera" or a "chat camera." In other words, in one embodiment, the main camera may be used to capture the forward scene and the chat camera may be used to capture a reflection in a user's cornea and, in another embodiment, the chat camera may be used to capture the forward scene and the main camera may be used to capture a reflection in a user's cornea.

In techniques for improving photography with the forward-facing camera 14 that are described herein, the rearward-facing camera 12 is used to capture a video stream containing content of a forward scene reflected in a cornea 16 of a user's eye 18. Adjustments to camera settings or operation of the forward-facing camera 14 are made based on analysis of the content of the reflected forward scene. The techniques are applicable to taking still photographs and to taking video with the forward-facing camera 14. Also, the techniques are applicable to configuring the settings of a variety of camera types including standard cameras, plenoptic lens cameras, stereo cameras, multi array cameras, etc.

Figure 2:
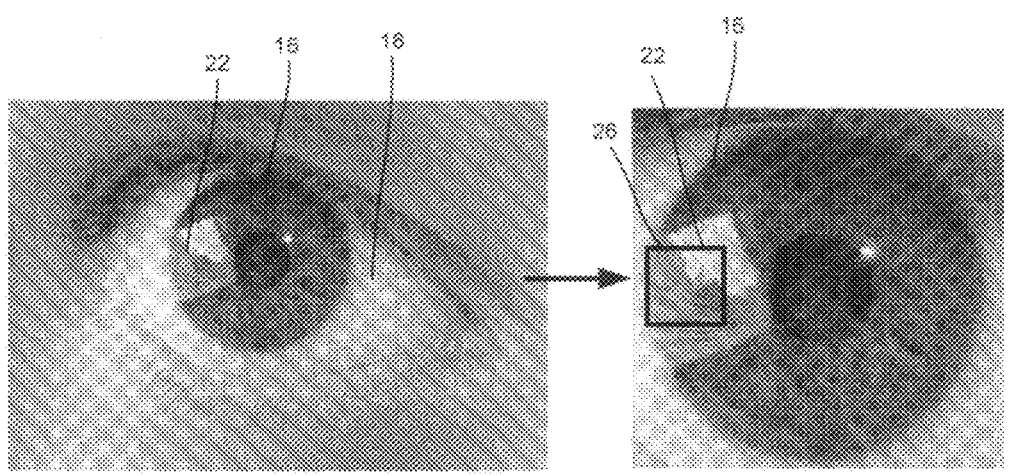
FIG. 2 is a representation of image information from a rearward-facing camera of the electronic device, the image information used for the improvement of the operation of the forward-facing camera.

With additional reference to FIG. 2, shown on the left is a representative image of the user's eye 18 taken with the rearward camera 12. The image is part of a video stream output by the rearward camera 12. As will be described, analysis of the output of the rearward-facing camera 12 is made on the video stream. A still image is illustrated for purposes of description. Shown on the right in FIG. 2 is a magnified version of the user's cornea 16 from the image on the left.

As can be seen, the combination of the cornea 16 of the user's eye 18 and the rearward-facing camera 12 form a catadioptric (mirror plus lens) imaging system with a very wide field of view of the forward scene. The field of view is denoted by reference numeral 20 in FIG. 1 and is bound by dash-dot arrows. Due to the curvature of the cornea (an ellipsoid of fixed eccentricity and size), this field of view 20 is relatively large. Also, the field of view 20 is the field of view of the user's cornea 16 acting as a probe for the catadioptric imaging system and not the field of view as perceived by the user or the field of view of the rearward-facing camera 12.

Reflected by the user's cornea 16 and captured by the rearward-facing camera 12 is a corneal reflection 22 of the content of the forward scene toward which forward-facing camera 18 is directed. The field of view 20 giving rise to the reflection 22 is larger than a field of view 24 of the forward-facing camera 14. The representative field of view 24 of the forward-facing camera 14 is shown as bound by long-dash/short-dash arrows in FIG. 1. Due to the relative difference in sizes (e.g., as measured by solid cone angles) of the field of view 24 of the forward-facing camera 14 and the field of view 20, more of the forward scene will appear in the reflection 22 than in the image captured with the forward-facing camera 14. For comparison, box 26 in FIG. 2 represents the portion of the forward scene captured with the forward-facing camera 14. It will be recognized, however, that the reflection 22 captured with the rearward-facing camera 12 is a mirror image and distorted by curvature of the cornea 16 relative to the image captured with the forward-facing camera 14.

In the exemplary illustration of FIG. 2, the forward scene is that of a building and surrounding landscape as viewed through a window having horizontal blinds. It will be recognized that the forward scene can be virtually any scene where a user employs the electronic device 10. For purposes of an illustrative description, we suppose that the user moves the electronic device 10 to pan the field of view 24 of the forward-facing camera 14 to the user's left. This correlates to movement of toward the right in the reflected version of the forward scene as shown in FIG. 2. We further suppose that the sun is located in this direction. Therefore, as the forward-facing camera 14 is moved, there will be a corresponding increase in glare or illumination conditions. But analyzing the output of the forward-facing camera 14 will be slow to detect the change in illumination due to its confined field of view 24. In the disclosed techniques, the reflection 22 may be analyzed to detect the brighter light coming into the field of view 24 of the forward-facing camera 14 before this could be detected by analyzing output from the forward-facing camera 14. The speed, direction and position of the incoming item (e.g., in this exemplary case, the brighter light condition) relative to the field of view of the forward-facing camera 14 may be ascertained by tracking relative motion of the electronic device 10 (e.g., using accelerometers) and/or by tracking motion of one or more items within the reflection 22 (e.g., using video processing). Using this information, the camera settings of the forward-facing camera 14 may be changed at an appropriate moment in time to improve taking a picture or video with the forward-facing camera 14. For instance, the adjustment to the camera setting of the forward-facing camera 22 may be timed with movement of the item relative to the field of view 24 of the forward-facing camera 14 to take effect when the item enters the field of view 24 of the forward-facing camera 14. Also, the adjustment to the camera setting may be made with consideration to the portion of the field of view 24 of the forward-facing camera 14 that the item is predicted to enter (e.g., the left-hand side, the upper-right corner, or other portion). Greater description of the disclosed techniques will be made below, along with additional examples of detectable items, characteristics of these items, and corresponding changes to settings of the forward-facing camera 14.

Figure 3:
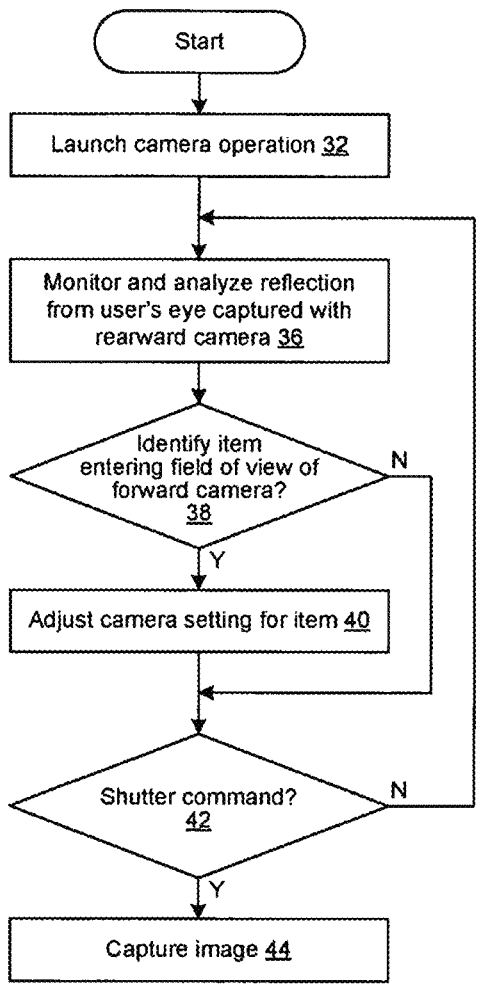
FIG. 3 is a flow diagram of camera functions carried out by the electronic device.
Figure 4:
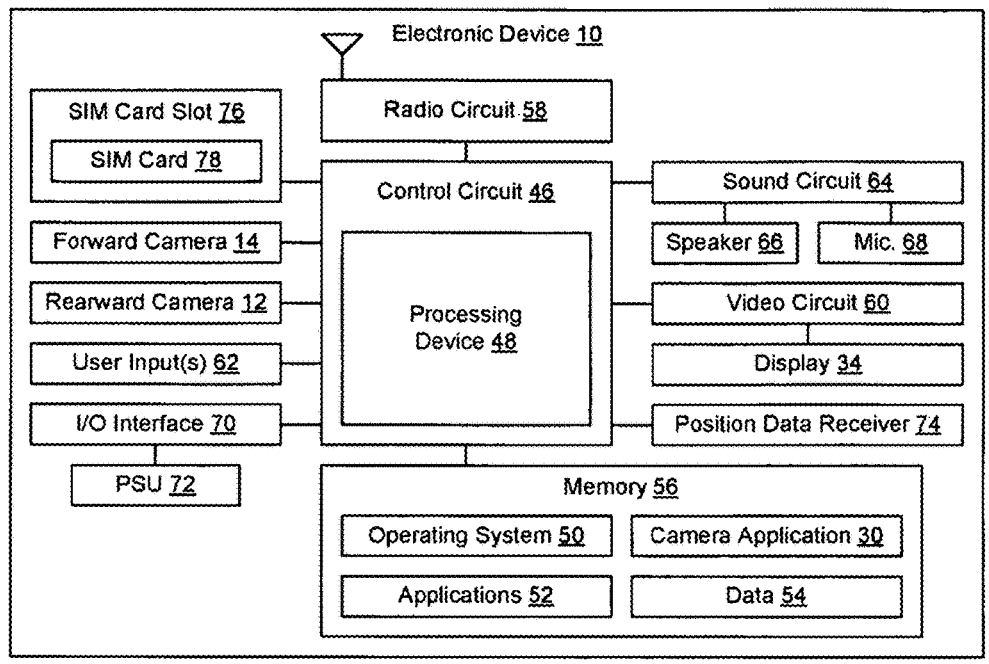
FIG. 4 is a schematic block diagram of the electronic device.

With additional reference to FIG. 3, illustrated is an exemplary flow diagram representing steps that may be carried out by the electronic device 10 to operate the cameras 12, 14 (e.g., as a camera system 28) according to the techniques described herein. In one embodiment, portions of the method are carried out by executing a camera control software application 30 (FIG. 4). Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may begin in block 32 where, in response to user action with the electronic device 10, the electronic device 10 launches operation of the forward-facing camera 14. The user action to launch operation of the forward-facing camera 14 may include selecting an icon from a graphical user interface displayed on a display 34 of the electronic device 10 or pressing a camera operation button. Launching operation of the forward-facing camera 14 may include activating the forward-facing camera 14 and outputting a video stream with the forward-facing camera 14. In one embodiment, the video stream is displayed on a display 34 of the electronic device 10 to aid the user in composing a photograph or video. As such, the display 34 acts as an electronic viewfinder during camera operation.

In addition to launching operation of the forward-facing camera 14, the electronic device 10 may activate the rearward-facing camera 12 to gather information to adjust settings of the forward-facing camera 14 to improve the quality of photographs or video taken with the forward-facing camera 14. For this purpose, the rearward-facing camera 12 outputs a video stream. In one embodiment, the video stream from the rearward-facing camera 12 has relatively high frame rate (e.g., 24 or more frames per second). To allow for a high frame rate, resolution may be sacrificed if needed.

In block 36, the video stream from the rearward-facing camera 12 is analyzed to identify the cornea 16 of one of the eyes 18 of the user. For this purpose, facial feature identification techniques may be employed. Face and facial feature techniques are relatively well understood and will not be described in detail for the sake of brevity.

Once the portion of the video stream containing the cornea 16 is identified, this area is analyzed to identify the reflection 22 of the forward scene. Also, the location of the circular area of the cornea 16 in the video stream may be tracked for continual monitoring of the reflection 22.

The reflection 22 is analyzed to create an environment map of the forward scene. From the environment map, an image (e.g., in the form of a video image) of the forward scene may be derived. An exemplary description of how to create an environment map from which an image of the forward scene may be derived is found at NISHINO, Ko et al., "Eyes for Relighting," Department of Computer Science, Columbia University, 2004. For purposes of a video image, the operations to derive the forward scene may be applied to each frame of the video stream.

Then, using the video image of the forward scene, items in the forward scene may be identified. More specifically, items that are moving relative to the field of the view 24 of the forward-facing camera 14 may be identified to detect items that may enter the field of view 24 of the forward-facing camera 14. An item of this nature may include, for example, a moving object such as a person, an animal, a car, etc. Another item of this nature may include a light source (e.g., area of high luminance) or a dark region (e.g., area of low luminance).

To determine if an item may enter the field of view 24 of the forward-facing camera 14, the video stream from the forward-facing camera 14 may be compared against the video image representing the reflection 22. Since the reflection 22 is a mirror image of the forward scene, one of the video stream from the forward-facing camera 14 or the video image representing the reflection 22 may be flipped horizontally to facilitate the comparison. The relative position and movement of objects and/or light sources common to both of these video streams may be determined and the relative location of the common objects and/or light sources in the video streams may be used determine the portion of the reflection 22 that corresponds to the field of view 24 of the forward-facing camera 14. Areas of the reflection 22 that are outside the portion of the reflection 22 corresponding to the field of view 24 of the forward-facing camera 14 are analyzed to find items that may enter the field of view 24 of the forward-facing camera 14.

In block 38, a determination is made as to whether an item is predicted to enter the field of view 24 of the forward-facing camera 14. If a positive determination is made, then the logical flow may proceed to block 40 where a camera setting of the forward-facing camera 14 is adjusted to improve taking of a quality photograph or video with the forward-facing camera 14 in which the photograph or video contains the item that was the subject of the determination in block 38. In one embodiment, adjustment of the setting is timed with the predicted arrival of the item in the field of view 24 of the forward-facing camera 14. In this case, the timing of the adjustment may be based on the speed and position of the item relative to the field of view 24 of the forward-facing camera 14.

In block 40, a camera setting for the forward-facing camera 14 is adjusted based on at least one characteristic of the identified item. Thus, the analysis of the reflection 22 may include determining one or more characteristics of the item. Example characteristics and corresponding changes to camera settings will be described. It will be appreciated that the described examples are not exhaustive and other characteristics may be evaluated and/or other adjustments may be made. A look-up table may be used to store the adjustments that are to be made for different types of characteristics and, in some embodiments, a quantification of the characteristic (e.g., light intensity, speed of movement, etc.). In some situations, more than one characteristic may be identified for an item and/or more than one setting may be adjusted based on one or more than one identified characteristic. Also, from movement information for the item, the location in the field of view 24 of the forward-facing camera 14 in which the item will appear may be determined and the adjustment may depend on the determined location within the field of view 24 of the forward-facing camera 14.

If the identified item is an object, the adjustment to the camera settings may be change to the shutter speed or other exposure settings to coordinate with the rate of movement of the object. Another adjustment may be to adjust autofocus or pre-adjust the focus of the forward-facing camera 14 for the arrival of the object based on the position relative to the field of view 24 and/or range of the object from the forward-facing camera 14. Another adjustment in camera setting may be to turn on time shift mode and capture a number of images (e.g., in the range of 2 to 50 photos) while the objected is predicted to be in the field of view 24 of the forward-facing camera 14. Another adjustment may be to turn a flash on, adjust the brightness of the flash, adjust the duration of the flash, or turn the flash off. In another embodiment, another adjustment is whether to use high-dynamic range (HDR) imaging and, if so, how HDR is to be configured or used (e.g., to reduce ghosting effects).

The adjustments may be made regardless of the nature of the object. In other embodiments, the analysis includes object identification for common types of objects, such as people, animals or cars. In another embodiment, the analysis may distinguish persons from other types of objects (e.g., non-humans). In these embodiments, the camera setting adjustment may depend on the results of the object identification analysis (e.g., the result of the object identification analysis being a characteristic of the item). Object identification may employ conventional object and person identification techniques, such as face detection, silhouette detection, shape analysis, etc. In addition, the speed of the object may be used to facilitate determination of the type of object by eliminating other possible objects from consideration. For instance, different types of objects of typically capable of moving in different speed ranges relative to the field of view 24 of the forward-facing camera 14. Relatively fast objects may be persons engaged in sporting activities or cars. Relatively slow objects may be people engaged in more routine activity.

If the type of object is identified, the adjustment to the camera setting may be made based on the type of object. The adjustment based on the type of object may be made instead of or in addition to adjustments made for other characteristics of the object (e.g., changes to shutter speed based on object speed relative to the field of view 24, turning on time shift mode, changing the focus based on position and/or range of the object, adjusting flash operation, etc.). For instance, if the object is identified as a person, a corresponding camera setting adjustment may be a change to color balance or other settings optimized for quality imaging of skin tones.

If the item is determined to be a light source (e.g., an area that is bright relative to illumination characteristics of the content of the field of view 24 of the forward-facing camera 14), then one or more camera settings may be made to compensate for the light source entering the field of view 24 of the forward-facing camera 14. These settings may include, for example, exposure settings, aperture size, focus, color balance, flash operation, etc. Another possible item is a dark area relative to illumination characteristics of the content of the field of view 24 of the forward-facing camera 14. This condition may also be interpreted as or results from a relatively bright area leaving the field of view 24 of the forward-facing camera 14. In the case of a dark area relative to illumination characteristics of the content of the field of view 24 of the forward-facing camera 14 entering the field of view 24 of the forward-facing camera 14, appropriate settings may be adjusted, such as aperture size, focus, color balance, flash operation, HDR, etc.

Following block 40 or following a negative determination in block 38, the logical flow may proceed to block 42. In block 42, a determination may be made as to whether the user has commanded the taking of a photograph or commanded the recording of a video. If so, an appropriate one of an image or a video is captured in block 44. Otherwise, the logical flow may return to block 36 to continue to monitor for items that are predicted to enter the field of view 24 of the forward-facing camera 14. In some embodiments, the operation of blocks 42 and 44 may be automated or not applicable. For instance, during the shooting of video, the functions of blocks 36, 38 and 40 may be carried out and adjustments to the camera settings may be made while the video is being taken. In another example, such as when a relatively fast moving item is approaching the field of view 24 of the forward-facing camera 14, it may be assumed that the user would like to capture the item in a photograph and time shift mode is automatically activated to capture multiple images during the predicted time when the fast moving item will be in the field of view 24 of the forward-facing camera 14.

With additional reference to FIG. 2, a schematic block diagram of the electronic device 10 in its exemplary form as a mobile telephone is illustrated. The electronic device 10 includes a control circuit 46 that is responsible for overall operation of the electronic device 10, including controlling the cameras 12 and 14 in accordance with the disclosed techniques. For this purpose, the control circuit 46 includes a processor 48 that executes an operating system 50 and various applications 52.

As indicated, the electronic device 10 may further include a camera application 30 that embodies the disclosed camera operation functions. In other embodiments, the camera control functions are part of the operating system 50 or part of another application that is executed by a dedicated camera control processor. The operating system 50, the applications 52 and the camera application 30, together with stored data 54 associated with the operating system 50, the applications 30, 52, and user files (including photographs and video taken with one or both of the cameras 12, 14), are stored on a memory 56. The operating system 50 and applications 30, 52 are embodied in the form of executable logic routines (e.g., lines of code, software programs, etc.) that are stored on a non-transitory computer readable medium (e.g., the memory 56) of the electronic device 10 and are executed by the control circuit 46. The described operations may be thought of as a method that is carried out by the electronic device 10.

The processor 48 of the control circuit 46 may be a central processing unit (CPU), microcontroller, or microprocessor. The processor 48 executes code stored in a memory (not shown) within the control circuit 46 and/or in a separate memory, such as the memory 56, in order to carry out operation of the electronic device 10. The memory 56 may be, for example, one or more of a buffer, a flash memory, a hard drive, a removable media, a volatile memory, a non-volatile memory, a random access memory (RAM), or other suitable device. In a typical arrangement, the memory 56 includes a non-volatile memory for long term data storage and a volatile memory that functions as system memory for the control circuit 46. The memory 56 may exchange data with the control circuit 46 over a data bus. Accompanying control lines and an address bus between the memory 56 and the control circuit 46 also may be present. The memory 56 is considered a non-transitory computer readable medium.

The electronic device 10 includes communications circuitry that enables the electronic device 10 to establish various wireless communication connections. In the exemplary embodiment, the communications circuitry includes a radio circuit 58. The radio circuit 58 includes one or more radio frequency transceivers and an antenna assembly (or assemblies). In the case that the electronic device 10 is a multi-mode device capable of communicating using more than one standard and/or over more than one radio frequency band, the radio circuit 58 represents one or more than one radio transceiver, one or more than one antenna, tuners, impedance matching circuits, and any other components needed for the various supported frequency bands and radio access technologies. The radio circuit 58 further represents any radio transceivers and antennas used for local wireless communications directly with an electronic device, such as over a Bluetooth interface.

The electronic device 10 further includes the display 34 for displaying information to a user. The display 34 may be coupled to the control circuit 46 by a video circuit 60 that converts video data to a video signal used to drive the display 34. The video circuit 60 may include any appropriate buffers, decoders, video data processors and so forth.

The electronic device 10 may include one or more user inputs 62 for receiving user input for controlling operation of the electronic device 10. Exemplary user inputs include, but are not limited to, a touch input that overlays the display 34 for touch screen functionality, one or more buttons, motion sensors (e.g., gyro sensors, accelerometers), and so forth.

The electronic device 10 may further include a sound circuit 64 for processing audio signals. Coupled to the sound circuit 64 are a speaker 66 and a microphone 68 that enable audio operations that are carried out with the electronic device 10 (e.g., conduct telephone calls, output sound, capture audio for videos taken with the camera 12 or 14, etc.). The sound circuit 64 may include any appropriate buffers, encoders, decoders, amplifiers and so forth.

The electronic device 10 may further include one or more input/output (I/O) interface(s) 70. The I/O interface(s) 70 may be in the form of typical electronic device I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 70 and power to charge a battery of a power supply unit (PSU) 72 within the electronic device 10 may be received over the I/O interface(s) 70. The PSU 72 may supply power to operate the electronic device 10 in the absence of an external power source.

The electronic device 10 also may include various other components. As an example, a position data receiver 74, such as a global positioning system (GPS) receiver, may be present to assist in determining the location of the electronic device 10. The electronic device 10 also may include a subscriber identity module (SIM) card slot 76 in which a SIM card 78 is received. The slot 76 includes any appropriate connectors and interface hardware to establish an operative connection between the electronic device 10 and the SIM card 78.

Figure 5:
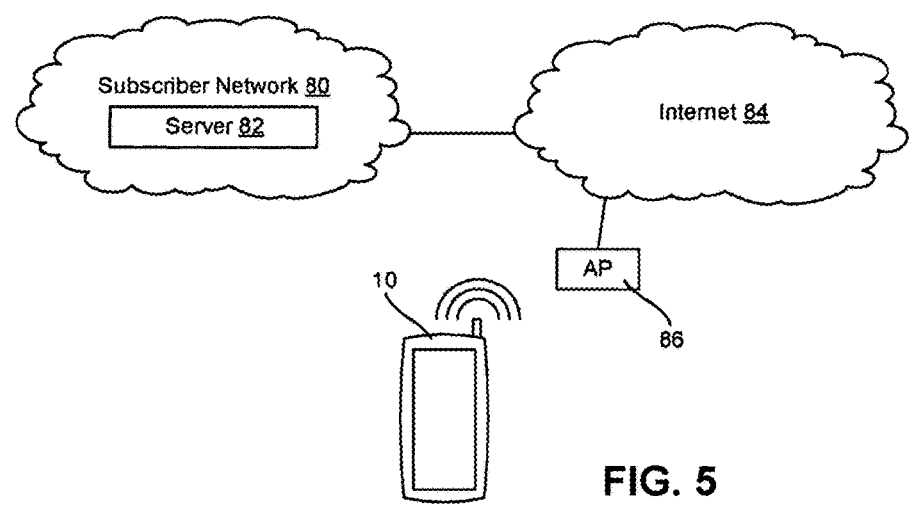
FIG. 5 is a schematic view of a communication environment for the electronic device.

Referring to FIG. 5, schematically shown is a communications environment for the electronic device 10. In the communications environment, the electronic device 10 may carry out wireless communications. To conduct wireless communications, the electronic device 10 establishes network connectivity with one or more networks. Typically, the connection is made to a subscriber network 80 that services the physical geo-location of the electronic device 10. The network 80 may provide Internet access to the electronic device 10. In most cases, the network 80 is a cellular network operated by a respective cellular service telephone company. Exemplary network access technologies for the network 12 are typically cellular circuit-switched network technologies and include, but are not limited to, global system for mobile communications (GSM), code division multiple access (CDMA), wideband CDMA (WCDMA), and advanced or alternative versions of these standards. The networks may support general packet radio service (GPRS), universal mobile telecommunications system (UMTS), 3G, 4G long-term evolution (LTE), or other standards.

The network 80 supports communications such as, but not limited to, voice communications (e.g., telephone calls), video communications (e.g., video telephony), messaging (e.g., instant messaging, text and multimedia messaging, and electronic mail messaging), data transfers, and Internet browsing. To support the communications activity of the electronic device 10, the network 80 may include a server 82 (or servers). The server 82 may be configured as a typical computer system used to carry out server functions and may include a processor configured to execute software containing logical instructions that embody the functions of the server 82 and a memory to store such software and related data.

The communications between the electronic device 10 and the subscriber network 80 may be established by way of a transmission medium (not specifically illustrated) of the subscriber network 80. The transmission medium may be any appropriate device or assembly, but is typically an arrangement of communications base stations (e.g., cellular service towers, also referred to as "cell" towers).

In some situations, the electronic device 10 may communicate with the Internet 84 via an access point 86 of a local area network (LAN) using a packet-switched protocol, such as IEEE 802.11a, IEEE 802.11b, IEEE 802.11g or IEEE 802.11n (commonly referred to as WiFi). Other LAN-based protocols are possible, such as WiMax under IEEE 802.16. The access point 86 is typically, but not necessarily, a wireless router.

Although certain embodiments have been shown and described, it is understood that equivalents and modifications falling within the scope of the appended claims will occur to others who are skilled in the art upon the reading and understanding of this specification.

What is claimed is:

1. A method of operating a camera system that includes a forward-facing camera directed at a forward scene and a rearward-facing camera directed at a rearward scene opposite the forward scene, the method comprising:
    analyzing a video stream containing a reflection of the forward scene in a cornea of an eye of a user of the camera system, the video stream captured with the rearward-facing camera and the analyzing including identifying an item in the reflection moving relative to a field of view of the forward-facing camera and predicted to enter the field of view of the forward-facing camera and identifying a characteristic of the item; and
    adjusting a camera setting of the forward-facing camera according to the characteristic of the identified item, the adjusted camera setting selected to improve capturing a photograph or video containing the item with the forward-facing camera, wherein at least a first portion of the reflection of the forward facing scene corresponds to a portion of the forward facing scene that is outside a field of view of the forward-facing camera, and the item in the reflection is in the first portion of the reflection.

2. The method of claim 1, wherein the adjustment to the camera setting of the forward-facing camera is timed with movement of the item relative to the field of view of the forward-facing camera to take effect when the item enters the field of view of the forward-facing camera.

3. The method of claim 1, wherein the identified item is an object and the camera setting is time-shift operation of the forward-facing camera.

4. The method of claim 3, wherein the time-shift operation is timed with movement of the item relative to the field of view of the forward-facing camera to take multiple images with the forward-facing camera when the object is in the field of view of the forward-facing camera.

5. The method of claim 1, wherein the identified item is one of an object or a light source and the identifying the characteristic including distinguishing whether the item is an object or a light source.

6. The method of claim 1, wherein the identified item is an object and the identifying the characteristic including detecting an object type for the item, the adjusted camera setting dependent on the detecting the object type.

7. The method of claim 1, wherein the identified item is an object and the identifying the characteristic including distinguishing if the object is a person or another object, the adjusted camera setting dependent on the distinguishing.

8. The method of claim 1, wherein the identified item is a light source and the adjustment to the camera setting compensates for the light source.

9. The method of claim 1, wherein the characteristic of the item is one or more of speed of movement relative to the field of view of the forward-facing camera, portion of the field of view of the forward-facing camera that the item is predicted to enter, brightness, range from the forward-facing camera, or object type.

10. An electronic device, comprising:
    a forward-facing camera directed at a forward scene;
    a rearward-facing camera directed at a rearward scene opposite the forward scene; and
    a control circuit that executes logical instructions to:
        analyze a video stream containing a reflection of the forward scene in a cornea of an eye of a user of the electronic device, the video stream captured with the rearward-facing camera, the analysis identifying an item in the reflection moving relative to a field of view of the forward-facing camera that is predicted to enter the field of view of the forward-facing camera and identifying a characteristic of the item; and
        adjust a camera setting of the forward-facing camera according to the characteristic of the identified item, the adjusted camera setting selected to improve capturing a photograph or video containing the item with the forward-facing camera,
        wherein at least a first portion of the reflection of the forward facing scene corresponds to a portion of the forward facing scene that is outside a field of view of the forward-facing camera, and the item in the reflection is in the first portion of the reflection.

11. The electronic device of claim 10, wherein the adjustment to the camera setting of the forward-facing camera is timed with movement of the item relative to the field of view of the forward-facing camera to take effect when the item enters the field of view of the forward-facing camera.

12. The electronic device of claim 10, wherein the identified item is an object and the camera setting is time-shift operation of the forward-facing camera.

13. The electronic device of claim 12, wherein the time-shift operation is timed with movement of the item relative to the field of view of the forward-facing camera to take multiple images with the forward-facing camera when the object is in the field of view of the forward-facing camera.

14. The electronic device of claim 10, wherein the identified item is one of an object or a light source and the identifying the characteristic including distinguishing whether the item is an object or a light source.

15. The electronic device of claim 10, wherein the identified item is an object and the identifying the characteristic including detecting an object type for the item, the adjusted camera setting dependent on the detecting the object type.

16. The electronic device of claim 10, wherein the identified item is an object and the identifying the characteristic including distinguishing if the object is a person or another object, the adjusted camera setting dependent on the distinguishing.

17. The electronic device of claim 10, wherein the identified item is a light source and the adjustment to the camera setting compensates for the light source.

18. The electronic device of claim 10, wherein the characteristic of the item is one or more of speed of movement relative to the field of view of the forward-facing camera, portion of the field of view of the forward-facing camera that the item is predicted to enter, brightness, range from the forward-facing camera, or object type.

\* \* \* \* \*